United States Patent
Kurz et al.

(10) Patent No.: US 9,679,384 B2
(45) Date of Patent: Jun. 13, 2017

(54) METHOD OF DETECTING AND DESCRIBING FEATURES FROM AN INTENSITY IMAGE

(75) Inventors: Daniel Kurz, Munich (DE); Peter Meier, Munich (DE)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 14/240,978

(22) PCT Filed: Aug. 31, 2011

(86) PCT No.: PCT/EP2011/064999
§ 371 (c)(1),
(2), (4) Date: May 16, 2014

(87) PCT Pub. No.: WO2013/029673
PCT Pub. Date: Mar. 7, 2013

(65) Prior Publication Data
US 2014/0254874 A1    Sep. 11, 2014

(51) Int. Cl.
*G06T 7/00* (2006.01)
*G06K 9/46* (2006.01)
(Continued)

(52) U.S. Cl.
CPC .............. *G06T 7/0051* (2013.01); *G06K 9/42* (2013.01); *G06K 9/4604* (2013.01); *G06T 7/593* (2017.01);
(Continued)

(58) Field of Classification Search
None
See application file for complete search history.

(56) References Cited

U.S. PATENT DOCUMENTS 6,631,364 B1 * 10/2003 Rioux ................. G06F 17/3025
2005/0002559 A1 * 1/2005 Terauchi et al. ...... G06T 7/0075
382/154
(Continued)

FOREIGN PATENT DOCUMENTS

GB        2432029        5/2007

OTHER PUBLICATIONS

ER Smith, RJ Radke, and CV Stewart, "Physical Scale Keypoints: Matching and Registration for Combined Intensity/Range Images," Int J Comput Vis (2012) 97:2-17.*

(Continued)

*Primary Examiner* — Matthew Bella
*Assistant Examiner* — Soo Shin
(74) *Attorney, Agent, or Firm* — Blank Rome LLP

(57) ABSTRACT

The invention provides methods of detecting and describing features from an intensity image. In one of several aspects, the method comprises the steps of providing an intensity image captured by a capturing device, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature. For example, the feature descriptor contains at least one first parameter based on information provided by the intensity image and at least one second parameter which is indicative of the scale.

24 Claims, 11 Drawing Sheets

(51) Int. Cl.
  *G06K 9/42* (2006.01)
  *G06T 7/73* (2017.01)
  *G06T 7/593* (2017.01)
(52) U.S. Cl.
  CPC ...... *G06T 7/73* (2017.01); *G06T 2207/10028* (2013.01); *G06T 2207/30244* (2013.01)

(56) References Cited

U.S. PATENT DOCUMENTS

| | | | |
|---|---|---|---|
| 2005/0069207 A1* | 3/2005 | Zakrzewski | B64D 45/0015 382/190 |
| 2008/0167814 A1* | 7/2008 | Samarasekera | G01C 21/005 701/469 |
| 2008/0279431 A1 | 11/2008 | Kitamura | |
| 2009/0016609 A1* | 1/2009 | Zakrzewski | B64D 45/0015 382/190 |
| 2009/0238460 A1* | 9/2009 | Funayama | G06K 9/4671 382/181 |
| 2010/0014781 A1* | 1/2010 | Liu | H04N 13/0022 382/285 |
| 2011/0293142 A1* | 12/2011 | van der Mark | G06T 7/0028 382/103 |
| 2012/0163672 A1* | 6/2012 | McKinnon | G06T 7/0075 382/106 |

OTHER PUBLICATIONS

YW Nijim, et al. PCT International Publication No. WO 2007/130122 (publication of PCT/US2006/041647).*
Baha et al. "Accurate Real-Time Disparity Map Computation Based on Variable Support Window," IJAIA, vol. 2, No. 3, Jul. 2011, pp. 22-34.*
Twr Lo et al. "SIFT Keypoint Descriptors for Range Image Analysis," Annals of the BMVA vol. 2008, No. 3, pp. 1-18 (2008).*
Hansen et al. "Scale Invariant Feature Matching with Wide Angle Images," Proceedings of the 2007 IEEE/RSJ International Conference on Intelligent Robots and Systems, San Diego, CA, USA, Oct. 29-Nov. 2, 2007.*
Lo et al. "Local feature extraction and matching on range images: 2.5D SIFT," Computer Vision and Image Understanding, vol. 113, 2009, pp. 1235-1250.*
Nijim et al. PCT International Publication No. WO 2007/130122.*
Schaffalitzky et al. "Viewpoint Invariant Scene Retrieval using Textured Regions," In R. C. Veltkamp, editor, Proc Dagstuhl Seminar on Content-based Image and Video Retrieval, Lec. No. in Comp. Sci., pp. 11-24, Springer, 2004.*
Schaffalitzky et al. "Viewpoint Invariant Texture Matching and Wide Baseline Stereo," In Proceedings of the 8th International Conference on Computer Vision, Vancouver, Canada, 2001, pp. 636-643.*
Smith et al. "Physical Scale Keypoints: Matching and Registration for Combined Intensity/Range Images," Int J Comput Vis (2012)97:2-17, published online: Jun. 11, 2011.*
Smith et al. "Physical Scale Keypoints: Matching and Registration for Combined Intensity/Range Images", International Journal of Computer Vision, vol. 97, No. 1, Jun. 11, 2011.
Smith et al. "Physical Scale Intensity Based Range Keypoints", Proceedings of the International Symposium on 3-d data processing visualization and transmission, May 1, 2010, p. 1-8.
Wu et al. "3d Model Matching with Viewpoint-Invariant Patches (VIP)", Computer Vision and Pattern Recognition, Jun. 23, 2008, pp. 1-8.
Cao et al. "Robust Alignment of Wide Baseline Terrestrial Laser Scans Via 3D Viewpoint Normalization", Applications on Computer Vision, Jan. 5, 2011, pp. 455-462.
D.G. Lowe "Distinctive Image Features from Scale Invariant Keypoints", Int. J. Comput. Vision 60, (Nov. 2, 2004), pp. 91-110.
Stuckler et al. "Interest Point Detection in Depth Images Through Scale-Space Surface Analysis", In Proceedings of the IEEE International Conference on Robotics and Automation (ICRA), May 2011.
Lo et al. Local Feature Extraction and Matching on Range Images: 2.5D SIFT. Comput. Vis. Image Underst. 113, 12, pp. 1235-1250, 2009.
Kristensen et al. "Real Time Extraction of Maximally Stable Extremal Regions on an FPGA", Dept. of Electroscience, 2007.
Johnson, "Learning Depth in Lightfield Images, CS229", Machine Learning Autumn 2005.

* cited by examiner figure 3
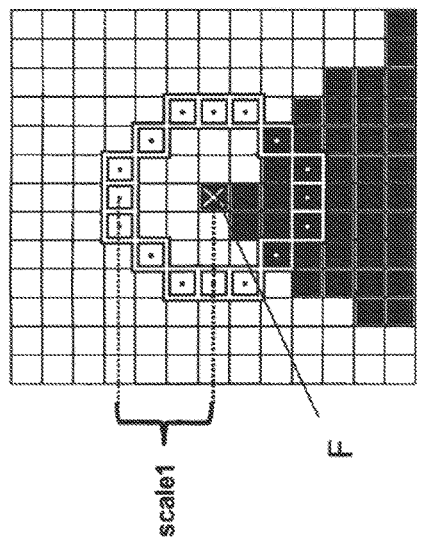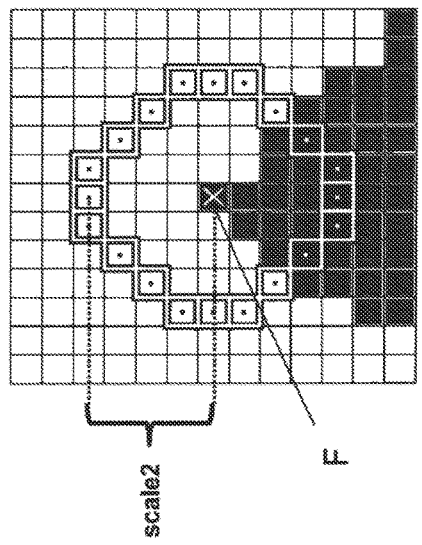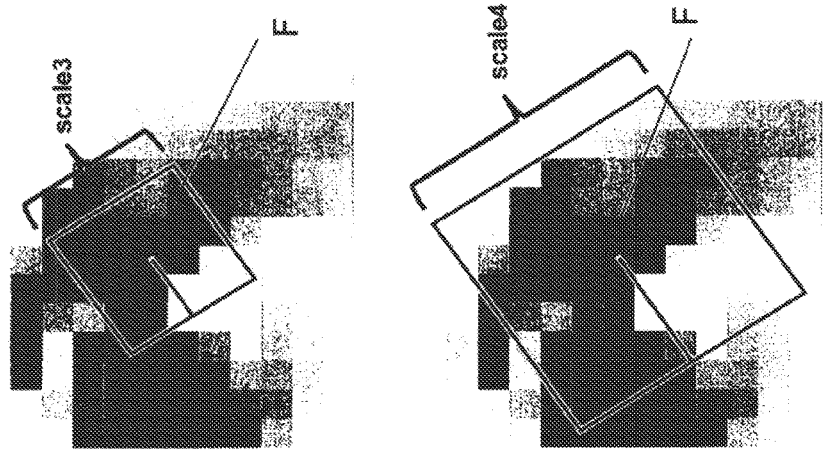
Example for the scale of a feature (detector), e.g. FAST    Example for the scale of a feature descriptor, e.g. SIFT    PRIOR ART Figure 5: Real scale feature detection Figure 6: Real scale feature description Figure 7: Scale-invariant real-scale-aware feature description

Figure 10: SIFT vs. Real scale features in a real scene
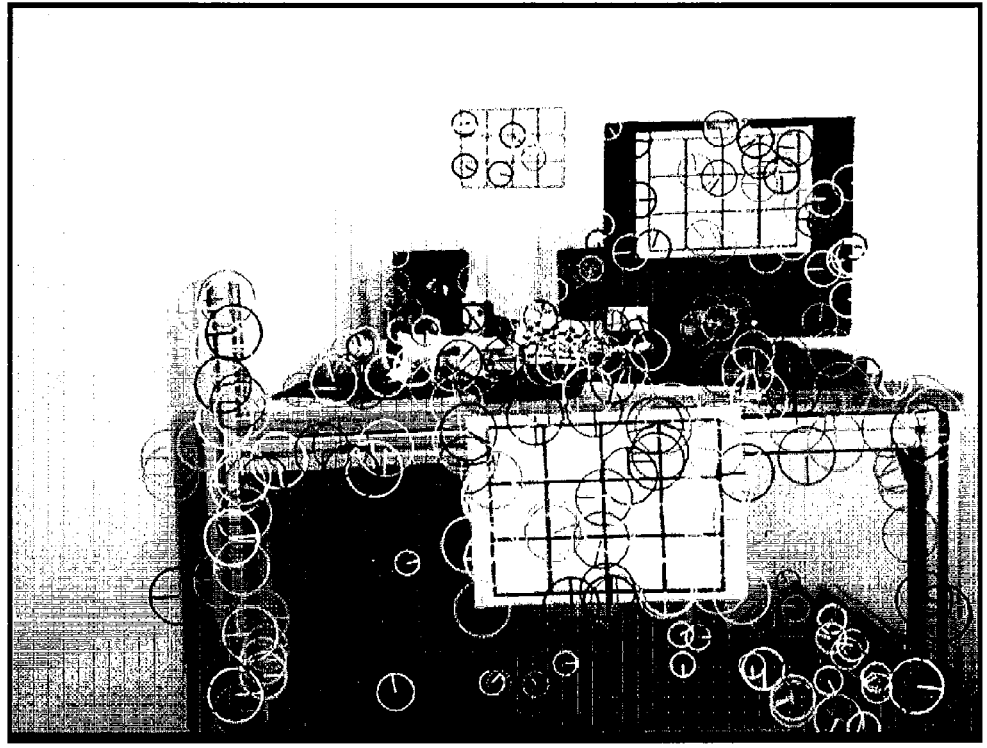
Proposed method (Real scale features)
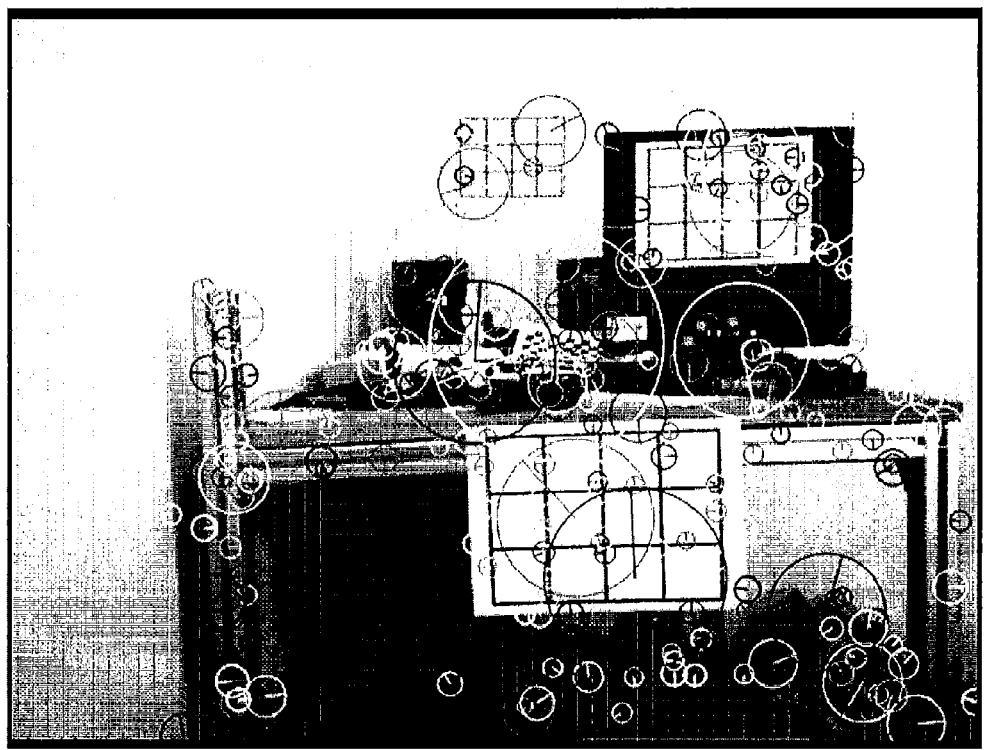
Standard scale-invariant features (SIFT)

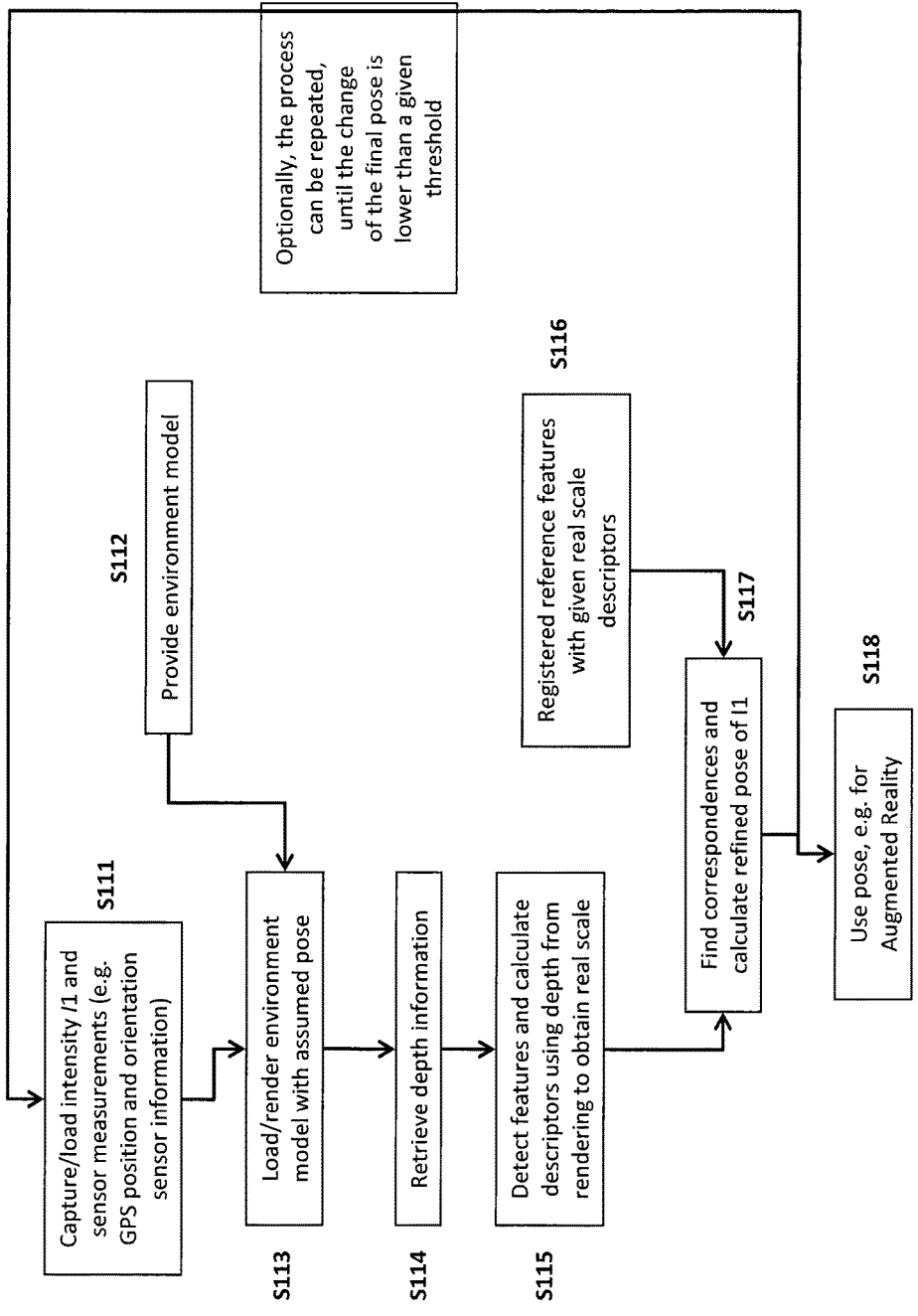

METHOD OF DETECTING AND DESCRIBING FEATURES FROM AN INTENSITY IMAGE

This application is entitled to the benefit of, and incorporates by reference essential subject matter disclosed in PCT Application No. PCT/EP2011/064999 filed on Aug. 31, 2011.

BACKGROUND OF THE INVENTION

1. Technical Field

The present invention is directed to methods of detecting and describing features from an intensity image.

2. Background Information

Many tasks in processing of images taken by a camera, such as in augmented reality applications and computer vision require finding points or features in multiple images of the same object or scene, which correspond to the same physical 3D structure. A common approach, e.g. as in SIFT (as disclosed in D. G. Lowe. Distinctive Image Features from Scale-Invariant Keypoints. *Int. J. Comput. Vision* 60, 2 (November 2004), pp. 91-110 ("Lowe")), is to first detect features in an image with a method that has a high repeatability. This means, that the probability is high that the point corresponding to the same physical 3D surface is chosen as a feature for different viewpoints, different rotations and illumination settings.

A feature is a salient element in an image which can be a point (often referred to as keypoint or interest point), a line, a curve, a connected region or any set of pixels. Features are usually extracted in scale space, i.e. at different scales. Therefore, each feature has a repeatable scale in addition to its two-dimensional position in the image. Also, a repeatable orientation (rotation) is usually computed from the intensities of the pixels in a region around the feature, e.g. as the dominant direction of intensity gradients.

Finally, to enable comparison and matching of features, a feature descriptor is needed. Common approaches use the computed scale and orientation of a feature to transform the coordinates of the descriptor, which provides invariance to rotation and scale. Eventually, the descriptor is an n-dimensional vector, which is usually constructed by concatenating histograms of functions of local image intensities, such as gradients disclosed in Lowe.

FIG. 1 outlines a standard approach of feature detection and description in a flow diagram. First, in step S11, an intensity image I is captured by a camera or loaded which is then optionally subject to pre-processing in step S12. Then, in step S14 after a scale space or a set of discrete scales has been defined in step S13, features are detected in that scale space and their canonical orientation (rotation) is computed and stored with the scale and position of every feature in the image. The detected features are designated with F(s,x,y,o) with s designating the scale, with x, y designating a 2-dimensional position, and o the orientation of the feature F. The extracted features are then described in step S15, with v designating the descriptor, before they are eventually used in an application (step S16).

Limitations of the Standard Approaches:

A strong limitation of any two-dimensional computer vision method is that it operates in a projected space. This makes it impossible to distinguish scale resulting from the distance of an object to the camera from scale resulting from the actual physical scale of an object.

Invariance to scale resulting from the distance of the camera to an object is clearly desirable in many applications, and was the original motivation for scale-invariance. However, in the presence of similar features at different physical scales, invariance to scale makes them indistinguishable. For instance, a descriptor as described in Lowe would not be able to distinguish between a real building and a miniature model of it.

Besides that, approaches that provide scale-invariance by computing a repeatable scale of a feature from image intensities are highly depending on the accuracy and repeatability of this computed scale.

Already Proposed Solutions:

Most naïve approaches to comparing features that use a similarity or distance function on a patch around each feature, e.g. Normalized-Cross-Correlation (NCC) or Sum-of-Absolute-Differences (SAD) are able to distinguish between similar features at different scales. However, these techniques are not invariant to scale resulting from the distance between the camera and an object, which is clearly desirable in real world applications. This means, they would be able to distinguish a real building from a miniature model, but they are not able to match either the building or the miniature model from different distances.

Approaches exist that work on combined range-intensity data. In addition to an intensity image they make use of a range map that contains dense depth information associated to the intensity image. The depth of a pixel refers to the distance between the principal point of the capturing device and the physical 3D surface that is imaged in that pixel.

FIG. 2 shows a scene consisting of two sets of dolls S1 and S2 (each set comprising a tall and a small doll), and a capturing device CD. A physical point PP1 of the set S1 is imaged in the pixel IP1 with the capturing device. The depth of this pixel is D1, the distance between the optical center OC of the capturing device, which defines the origin of the camera coordinate system, and the physical point PP1. Analogously, a second physical point PP2 of the set S2 is imaged in IP2 and has the depth D2. Note that an estimate of the camera intrinsic parameters (in particular focal length) allows for computing the 3D position in Cartesian coordinates of a point PP1 given its depth D1 and its pixel position on the image plane IP1.

E. R. Smith, C. V. Stewart, and R. J. Radke, Physical Scale Intensity-Based Keypoints, 5th Intl Symposium on 3D Data Processing, Visualization and Transmission, May 2010 ("Smith") present a method to detect and describe features at physical scale from combined range-intensity data that is illustrated in FIG. 4. Given an intensity image and a registered dense depth map (step S41), they first compute a normal for every point in the depth map in step S42. They then project the intensity image pixels onto the tangent planes of the depth points (step S43) and triangulate the back-projected intensity pixels resulting in an image mesh in step S44. All following steps are performed on this image mesh, which is a 3D mesh at physical scale with intensity information for every vertex.

The authors then define a set of physical scales at which to detect features from the mesh (step S45). A smoothing kernel which computes contribution weights based on the distance of a point and the normal of the point is used to smooth both intensities and normals in the image mesh to different physical scale spaces (step S46). Local extrema of the Laplace-Beltrami Operator on the smoothed image meshes are used as features (step S47). For feature description, they use a 3D coordinate frame for each feature defined by its normal and the dominant gradient direction of neighboring pixel intensities projected onto the tangent plane (steps S48, S49). This 3D coordinate frame is used to transform the coordinates of their feature descriptor to provide invariance to rotation and viewpoint (step S410). Eventually, an application uses the described features in step S411.

While this approach clearly improves the feature description process, the creation and processing of the image mesh is very costly and requires dense depth data. After the meshing process, step S48 is another costly step.

A similar approach has been proposed by Wu et al. (e.g., C. Wu, B. Clipp, X. Li, J.-M. Frahm, and M. Pollefeys. 3D model matching with Viewpoint-Invariant Patches (VIP), Computer Vision and Pattern Recognition, IEEE Computer Society Conference on, pp. 1-8, 2008), wherein they use the known local geometry around a feature candidate to compute the tangent plane and carry out feature detection and description on a projection of the textured 3D model onto that tangent plane. However, their descriptor is scale-invariant and therefore does not provide the benefits of the proposed technique.

Note, that throughout this disclosure, the terms "physical scale" and "real scale" are interchangeable.

Related work on feature descriptors on range data:

There exists a variety of literature on extraction and description of features in range images, e.g. as disclosed in J. Stückler and S. Behnke, Interest Point Detection in Depth Images through Scale-Space Surface Analysis. In Proceedings of the IEEE International Conference on Robotics and Automation (ICRA), Shanghai, China, May 2011 ("Stückler"); T.-W. R. Lo and J. P. Siebert, Local feature extraction and matching on range images: 2.5D SIFT. *Comput. Vis. Image Underst.* 113, 12, pp. 1235-1250, 2009 ("Lo") These work entirely on range images and do not use any intensity image. Range images encode the distance of the environment towards the camera per pixel. It is possible to display range images representing distances as intensities, but their data origin stays different. Range images can be created in many different ways, when either range data or 3D data exists. When we speak of intensity images throughout this disclosure, we refer to images representing different amounts of light reflected from the environment, mostly depending on the environment's material and the light situation. Intensity images can encode intensity in one (e.g. grayscale) or more than one channels (e.g. RGB—red-green-blue) in different bit resolutions (e.g. 8 bit or high dynamic range).

Stücklerexploits scale space on range images to detect scale-invariant features. Thereby, their approach does not provide distinctiveness of similar features at different scales. Similarly, 2.5D SIFT (e.g., as disclosed in Lo) is an adaption of SIFT to range images without any intensity data. This scale-invariant feature detector and descriptor computes for every feature the surface normal and the dominant gradient direction in the range data around the feature to define a 3D canonical orientation for every feature that is used to transform its descriptor. The latter then computes histograms of shape indices in the support region of the descriptor.

Any naïve approach to describe features in range data, that is not scale-invariant, enables matching of a feature at different distances and discrimination of similar features at different scales.

Such feature descriptors that solely use range images work well for a variety of scenes and objects. However, man-made objects and environments mainly consist of piecewise planar surfaces. While planar surfaces do not contain any useful information for a distinct description, edges and corners in man-made environments are very often perpendicular and highly repetitive. In such cases, the texture, visible in the intensity image, can often provide more distinct information about a feature.

It is an object of the present invention to provide a method of detecting and describing features from an intensity image which is invariant to scale resulting from the distance between the camera and the object, but is sensitive to the real (physical) scale of an object for a variety of applications.

SUMMARY OF THE INVENTION

According to an aspect of the invention, there is provided a method of detecting and describing features from an intensity image, comprising the steps of providing an intensity image captured by a capturing device, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

According to an embodiment, the feature descriptor contains at least one first parameter based on image intensity information provided by the intensity image, and contains descriptor coordinates which are scaled depending on the depth of at least one element in the intensity image being a part of the detected feature, or the feature descriptor describes the detected feature based on information provided by the intensity image in a support region around the detected feature, wherein the support region is scaled depending on the depth of at least one element in the intensity image being a part of the detected feature.

According to another aspect of the invention, there is provided a method of detecting and describing features from an intensity image, comprising the steps of providing an intensity image captured by a capturing device, providing a method for determining a depth of at least one element in the intensity image, detecting at least one feature in the intensity image based on image intensity information provided by the intensity image, providing a feature descriptor of the at least one detected feature, wherein the feature descriptor contains at least one first parameter based on image intensity information provided by the intensity image, and contains descriptor coordinates which are scaled depending on the depth of at least one element in the intensity image being a part of the detected feature, or wherein the feature descriptor describes the detected feature based on information provided by the intensity image in a support region around the detected feature, wherein the support region is scaled depending on the depth of at least one element in the intensity image being a part of the detected feature. When referring to descriptor coordinates, we refer to the coordinates of the intensity values, from which the descriptor is build in relation to a defined feature center. FIG. 3 helps to understand the concept.

According to another aspect of the invention, there is provided a method of detecting and describing features from an intensity image, comprising the steps of providing an intensity image captured by a capturing device, providing a method for determining a depth of at least one element in the intensity image, detecting at least one feature in the intensity image based on image intensity information provided by the intensity image, and providing a feature descriptor of the at least one detected feature with an indicator of a particular scale, the feature descriptor containing at least one first parameter based on information provided by the intensity image, and at least one second parameter indicative of a combination of the scale and a depth of at least one element in the intensity image being a part of the detected feature.

The invention is also concerned with a computer program product adapted to be loaded into the internal memory of a digital computer and comprising software code sections by means of which the method according to any of the described aspects and embodiments of the invention is performed when said product is running on said computer.

It is thus proposed to utilize the depth of an element in the intensity image (e.g. a pixel) for feature detection and/or description at that particular element (pixel) in an intensity image. Thereby, features can be detected and described at real (physical) scale, providing an improved distinctiveness compared to standard scale-invariant feature descriptors on intensity images without introducing any constraints on the camera movement.

According to an aspect of the invention, in the proposed methods a decision is made in the feature detection process whether at least one element in the intensity image belongs to a detected feature or not depending on intensity values in the intensity image.

Particularly, according to an aspect of the invention, the proposed methods detect and describe features based on intensity images only. Particularly, the depth of a feature is used to improve the process by relating to a real (physical) scale, but in contrast to the state of the art, any other knowledge of the local geometry around a feature is not used.

The approach described in Smith might be contemplated in the context of the above mentioned object, but it is not universally applicable as it operates on an image mesh and projects gradients in the feature neighborhood to the tangent plane of the feature. This requires dense depth data and cannot be applied on an image with sparse depth information. It is also more computational intensive compared to the solution of the invention, which was optimized for performance, while at the same time has nearly all advantages of Smith.

The methods according to the invention in an aspect use one scalar value only, which is an indication of a distance, to improve the detection and/or description of a feature which is both detected and described solely from the 2D intensity image.

Different methods exist to provide depth information associated to particular pixels in an intensity image. Examples include stereo vision, time-of-flight cameras and approaches using structured light. In the following, we assume that we are provided with an intensity image and a method for determining a depth of at least one element in the intensity image. This method can for instance be a lookup operation in an associated depth map (possibly using interpolation and/or extrapolation) or it can be the computation of depth from stereo given a second intensity image containing the corresponding physical element from a different view.

BRIEF DESCRIPTION OF THE DRAWINGS

Further aspects and embodiments of the invention will now be described in more detail by referring to the following Figures in which:

FIG. 3 illustrates the scale or size of a feature in respect to a FAST corner detector and a SIFT feature descriptor, as common examples for a method to detect point features.

FIG. 10 shows an exemplary result of applying aspects of the invention to SIFT features (right) compared to a standard approach (left).

FIG. 11 shows a possible use of descriptors determined according to the technique of the invention.

DETAILED DESCRIPTION OF THE INVENTION

Figure 1:
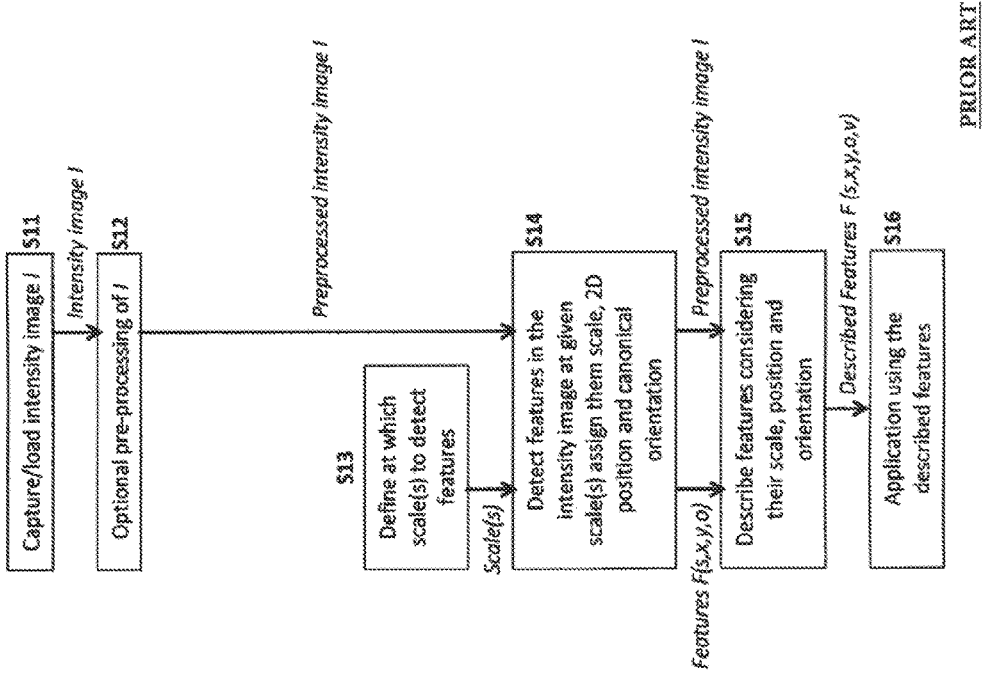
FIG. 1 outlines a standard approach of feature detection and description in a flow diagram.
Figure 2:
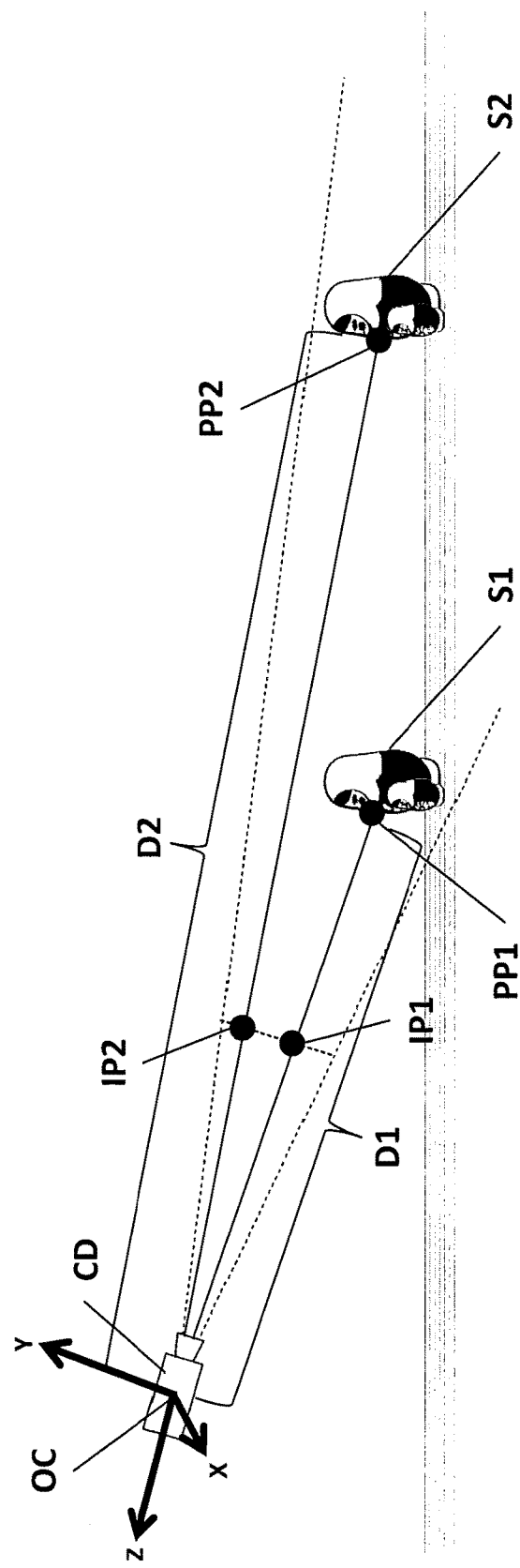
FIG. 2 shows an exemplary scene consisting of two sets of dolls with each set comprising a tall and a small doll, and a capturing device.
Figure 4:
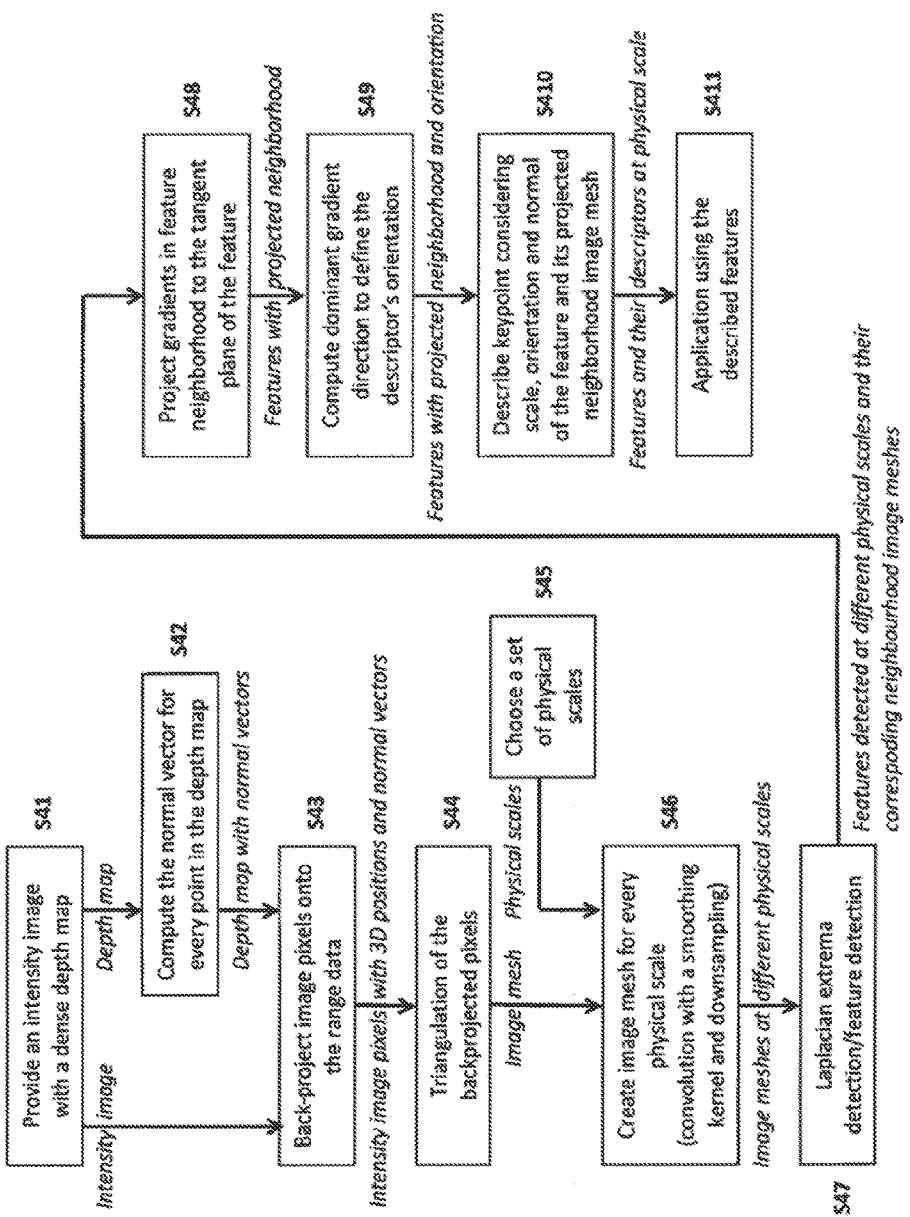
FIG. 4 illustrates a method to detect and describe features at physical scale from combined range-intensity data.

The following description of aspects of the invention shall be understood by the skilled person as being only embodiments for explaining and illustrating principles and aspects of the invention without limiting the scope of the invention as defined in the appended claims.

1. Feature Detection at Real Scale According to a First Aspect of the Invention:

Generally, a method according to this aspect comprises the steps of providing an intensity image captured by a capturing device, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

According to an embodiment, the feature descriptor contains at least one first parameter based on image intensity information provided by the intensity image and at least one second parameter which is indicative of the scale.

According to an embodiment, the feature descriptor contains at least one first parameter based on image intensity information provided by the intensity image, and contains descriptor coordinates which are scaled depending on the depth of at least one element in the intensity image being a part of the detected feature, or the feature descriptor describes the detected feature based on information provided by the intensity image in a support region around the detected feature, wherein the support region is scaled depending on the depth of at least one element in the intensity image being a part of the detected feature.

A feature is a salient element in an image which can be a point (often called keypoint or interest point in the literature), a line, a curve, a region (e.g. as described in F. Kristensen and W. MacLean: Real-Time Extraction of Maximally Stable Extremal Regions on an FPGA. Dept. of Electroscience, Lund University, Sweden 2007) or any other subset of the image. Feature detection algorithms are usually saliency detectors. For example, they find lines, edges, or local extrema of a differential operator. A feature detector can be seen as a function mapping a region of pixels to a response. In the literature, this region is referred to as sampling window, support region or measurement aperture of the feature detector. The response is eventually thresholded to decide which elements are features and which are not. In order to extract features at a certain scale, either the sampling window or support region can be scaled accordingly or the image is scaled with the inverse scale factor before computing the response of the feature detector. The scale (or size) of a feature is then defined as the size of the sampling window or support region used to detect it.

In this context, FIG. 3 illustrates a size of the FAST corner detector (illustration on the left side), as common example for a method to detect point features. In this example, the scale (or size) of a feature F is defined as "scale1" or "scale2" as shown which corresponds to the size of the sampling window or support region (here defined by the circular set of pixels) used to detect it. On the left side of FIG. 3, the image region (here delimited by the circular set of pixels) that contributes to the decision if a pixel is a feature or not (sampling window or support region) is shown at two different scales, scale1 and scale2 designating two different sizes of the support region.

For example, in an aspect of the invention, the method comprises the steps of defining a support region as a region covering a portion of the intensity image, detecting at least one feature in the intensity image based on information in the support region around the feature, wherein a size of the support region is determined in correspondence with the scale at which the at least one feature is detected.

According to an embodiment, the scale at which the at least one feature is detected depends on a depth sample for the support region. For example, the support region (in pixels) is scaled inversely proportional to the depth of at least one element in the intensity image for which the feature detection process determines whether it is a part of the detected feature.

Common examples for feature detection methods include Laplacian of Gaussian (LoG), Difference of Gaussians (DoG), Determinant of Hessian (DoH), Maximally stable extremal regions (MSER), Harris features, or learning-based corner detectors such as FAST. To detect edge features, widely known algorithms such as Canny, Sobel or Prewitt can be applied.

For example, feature detection is performed at at least one scale that depends inversely proportional on the depth of at least one element in the intensity image for which the feature detection process determines whether it is a part of a detected feature.

According to an embodiment, the at least one scale at which the at least one feature is detected corresponds to a physical size of the feature.

In one possible implementation of this invention, we propose to make the decision if an element is a feature or not depending on the values in the intensity image and the depth of that element. More specifically, for each detected element, we carry out the feature detection at one or more scales that depend inversely proportional on the depth of the putative element.

In one implementation of the invention, the feature detection only uses one real scale (e.g. in mm) to detect features. In another implementation, more than one real scales (e.g. in mm), which depend on the depth are used to detect features (e.g. 30 mm and 60 mm for features further away than 50 cm and closer than 100 cm). Therefore, while the image scale (in pixels) is turned to real scale, for example by making it inversely proportional to the depth, the physical or real scale in metric distances can be scaled differently and independently.

Thereby, the scale(s) at which features are detected correspond to a real (physical) size instead of a scale in camera pixel units.

An estimate of the focal length of the capturing device is needed to detect features at absolute real scales.

Figure 5:
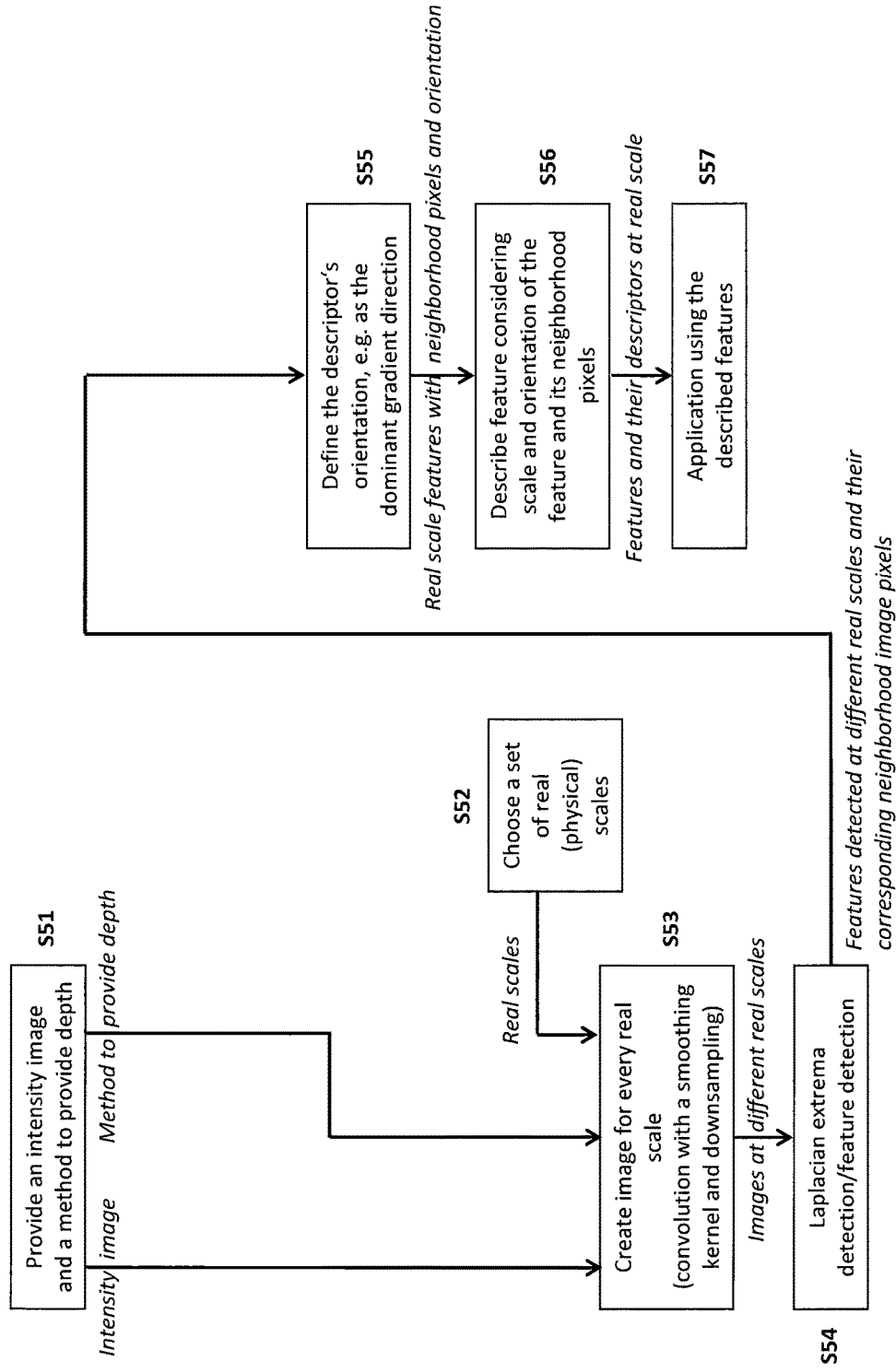
FIG. 5 shows a flow diagram of a method according to an embodiment of an aspect of the invention.

FIG. 5 shows a flow diagram of an exemplary embodiment of this approach according to the first aspect of the invention. Step S51 captures an intensity image with a capturing device, such as a camera, or loads an intensity image, and provides a method to determine the depth of at least one element, such as a particular pixel, in the intensity image (regarding possible implementations of such a method, further details are provided below). Step S52, which defines at which scales to extract features, is depending on depth samples. For each support region, which can be as small as a pixel, the scale(s) at which to detect features in the intensity image depend(s) on a depth sample for the region. In one embodiment of the invention the support region consists of more than 8 pixels. As explained above, one possible way of determining scales from the depth is an inversely proportional relationship which results in real (physical) scales. Afterwards, step S53 generates representations of the provided intensity image for different scales. In step S54, features are detected at the desired scales. Particularly, in the feature detection process respective representations of the intensity image for different scales are generated and features in the intensity image are detected at the respective scales. For feature description, at least one orientation is assigned in step S55, e.g. as the dominant gradient direction of neighboring pixels or using an orientation sensor measurement, e.g. aligned with the gravity force. Eventually, the features are described in step S56 considering their scale and orientation and step S57 uses the described features as in the standard approach.

Note that particularly steps S53 and S54 are exemplary. Any method that allows detecting features at different scales can be applied here, including those methods that scale their sampling apertures (or support regions) instead of working on scaled versions of the intensity image.

An embodiment of the invention uses point features (i.e. keypoints or interest points). The feature detection is in this case performed with a method that decides for a single point in an image (i.e. a pixel) if it is a feature or not based on the image intensities in a sampling window around the point.

For example the FAST corner detector, which is frequently used as feature detector, would be used in an implementation of the invention as follows. Given a pixel, the detector determines if it is a feature (corner) or not depending on its intensity and the intensities of pixels on a circle around it with a radius of 3.5 pixels. The proposed method would first determine the depth of that pixel from a depth-providing method. Given this depth ($Depth_{real}$), a desired real scale ($Radius_{real}$), and the focal length of the capturing device in pixels ($FocalLength_{pixel}$), the diameter or radius in pixels ($Radius_{pixel}$) corresponding to the desired real scale can be computed as follows:

$$Radius_{pixel} = FocalLength_{pixel} * Radius_{real} / Depth_{real}$$

As explained above, the scale in the image corresponding to some real scale on the surface varies inversely proportional to the depth. This is one possible way of determining scales from the depth.

To detect a feature at the real scale which corresponds to the radius $Radius_{real}$ for the FAST corner detector, either a modification of the original detector would be used that operates with a radius of $\text{Radius}_{pixel}$ pixels instead of the default 3.5 pixels, or a patch around the candidate pixel with a radius of $\text{Radius}_{pixel}$ is scaled by a factor of $\text{Radius}_{pixel}/3.5$, and detection is carried out with the standard detector on that scaled image patch.

Instead of providing an individual scale for each depth, it might be computationally advantageous to assign a range of depths to a scale. E.g. the range of 5-10 m is assigned the scale of 100 mm and the range above 10 m is assigned to 300 mm.

Another possible embodiment of the invention might use other depth-indicating values, instead of the depth, as described above. One embodiment uses the z-value of a Cartesian coordinate system centered at the camera, where the z-axis is collinear with the camera's optical axis.

In general, it is also clear, that the depth or distance, does not have to be exactly measured from the camera's center.

Optionally, the image, or part of the image, can be undistorted, according to additional intrinsic parameters before the features are extracted or the descriptor is built.

In comparison to the approach in disclosed in Smith the present invention does not need the expensive steps of normal computation (which requires dense depth data), back-projection of the image into 3D, and triangulation. Instead of an image mesh, the approach of the invention uses a simple 2D intensity image for creating scale spaces. It does not perform any normalization of the neighborhood based on the tangent plane as in disclosed in Smith and also does not consider the normal in the feature description at all.

Particularly, according to the invention, during the feature detection process no 3D mesh based on the depth data is created.

2. Feature Description at Real Scale According to a Second Aspect of the Invention:

Generally, a method according to this aspect comprises the steps of providing an intensity image captured by a capturing device, providing a method for determining a depth of at least one element in the intensity image, detecting at least one feature in the intensity image based on image intensity information provided by the intensity image, providing a feature descriptor of the at least one detected feature.

In a first possibility, the feature descriptor contains at least one first parameter based on image intensity information provided by the intensity image, and contains descriptor coordinates which are scaled depending on the depth of at least one element in the intensity image being a part of the detected feature.

Alternatively, in a second possibility the feature descriptor describes the detected feature based on image intensity information provided by the intensity image in a support region around the detected feature, wherein the support region is scaled depending on the depth of at least one element in the intensity image being a part of the detected feature.

A feature descriptor describes a feature based on the available information in a support region of the image around the feature. The scale of a feature descriptor is the size of that support region. For clarity and as an example, FIG. 3 illustrates on the right side of the illustration the support region of a SIFT descriptor (here defined by a frame or rectangle with a contrast gradient depicted as straight line) at two different scales, scale3 and scale4 designating different sizes of the support region, here of the frame or rectangle.

The scale of a descriptor is usually chosen linearly depending on the scale of the feature to describe. In one preferred embodiment of this invention, the supporting pixels used for building the feature descriptor consist of pixels specified by a geometry around a pixel (e.g. on the edge of a circle, or all pixels inside an ellipse), which has been identified as a feature, where the geometry only varies according to depth. The variation can be resizing the geometry or changing the shape of the geometry at different depths. Different depths can be intervals, for example 0-0.5 m and 0.5 m-5 m and above 5 m. Note, that by support region we refer to the part of the support region that has non-zero contribution weights.

For example, supporting points in the intensity image are used for providing the feature descriptor which comprise points specified by a geometry around one of the points which has been identified in the feature detection process as being a part of the detected feature, wherein the geometry varies according to the depth of the one of the points, particularly wherein the variation can be resizing the geometry or changing the shape of the geometry at different depths.

According to an embodiment, support regions at different real scales are used, wherein of these support regions a support region is determined to be smaller at a smaller determined depth and larger at a greater determined depth.

A feature descriptor can be a real-numbered vector, e.g. SIFT or SURF, but can also be classification-based approach such as random FERNS. In addition, statistical descriptors, like curvature or (physical) length of a contour can be used. In essence, any method that enables matching of features is considered a feature descriptor in the parlance of this disclosure.

According to an aspect of the invention, it is proposed to describe a feature depending on the values in the intensity image and the depth of the feature, provided by the method described above. More specific implementations of this proposal are explained below.

According to an embodiment, the support region of the feature descriptor is scaled inversely proportional to the depth of at least one element in the intensity image being a part of the detected feature.

According to another embodiment, the descriptor coordinates of the feature descriptor are scaled inversely proportional to the depth of at least one element in the intensity image being a part of the detected feature.

Particularly, it is proposed to scale the coordinates or the support region of the feature descriptor inversely proportional to the depth of the feature. This results in the scale of the feature descriptor corresponding to a real scale and does not only improve repeatability of feature descriptor scale but also enables distinguishing similar features at different physical scales.

If the real scale should correspond to an absolute scale that could be used across different devices, an estimate of the focal length of the Capturing device is needed. The scale in pixels ($S_{pixels}$) corresponding to an absolute real scale ($S_{real}$) at a certain distance ($\text{Depth}_{real}$) is then computed as $$S_{pixels} = \text{FocalLength}_{pixels} * S_{real} / \text{Depth}_{real}.$$

Figure 6:
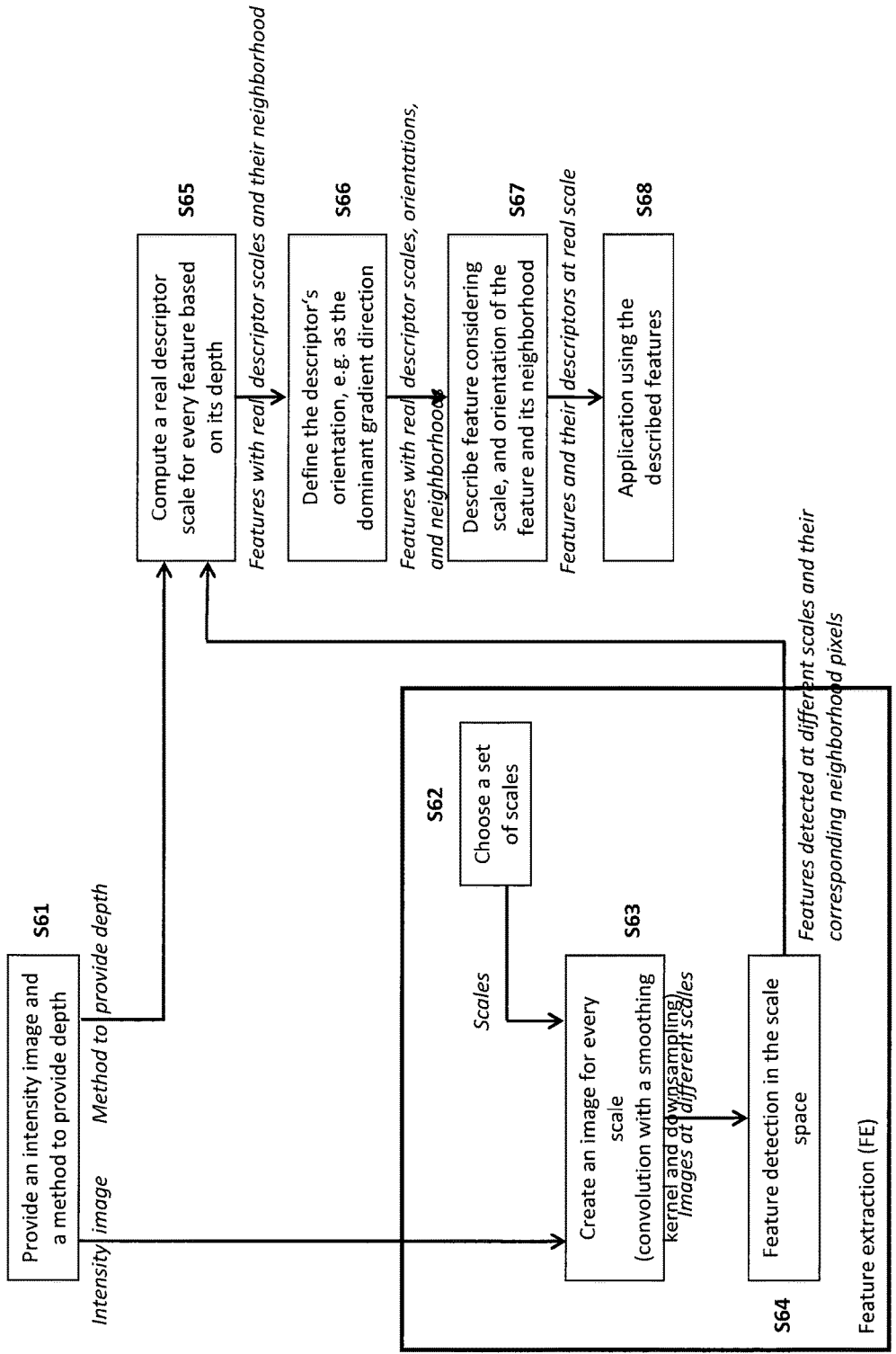
FIG. 6 shows a flow diagram of a method according to an embodiment of another aspect of the invention.

FIG. 6 shows a flow diagram of a method according to an embodiment of the second aspect of the invention. After capturing an intensity image with a capturing device or loading an intensity image and providing a method that gives the depth of a requested pixel in step S61, features are detected in step S63 at scales defined in step S62. These scales do not have a known relation to real (physical) scales but are defined in image coordinates. For describing a feature in step S65, we incorporate the depth of the feature provided by the depth-providing method. The depth is used to scale the descriptor coordinates to correspond to a real scale, as explained above. After orientation assignment in step S66, the features are described using the descriptor scale corresponding to a real scale in step S67. Eventually, the described features are used in an application in step S68. In possible implementations of the invention, features are extracted in order to provide depth (e.g. using a stereo camera). In that case, the features can immediately be passed to step S65 and steps S62, S63 and S64 (i.e. feature extraction FE corresponding to steps S53 and S54 in FIG. 5) do not have to be conducted (any more).

An embodiment of the method proposed in this section uses point features (i.e. keypoints or interest points) and feature descriptors for such features. Given a 2D point in an image, a scale and optionally an orientation, it computes a descriptor, which can for instance be represented by a real-valued vector based on the intensity values in the support region around a feature. Popular examples of such methods include SIFT and SURF.

FIG. 10 shows the result of applying our invention to SIFT features (right) compared to the standard approach (left).

To support handling scenes with strong depth variations, we propose to define multiple desired feature descriptor scales that correspond to real scales. So one possible embodiment of the invention uses different real scale support regions, where the support region is smaller at smaller depths and larger at higher depth values. For example, a support region of 50 mm×50 mm does not make sense when imaging a far away mountain, as it would cover way less than a pixel. On the other hand, a support region of 10000 mm×10000 mm might make sense for such a scene, while it is clearly unfeasible in an indoor desktop environment.

According to an embodiment of the first aspect and/or the second aspect, the scale is defined as a global setting and the feature descriptor does not contain at least a second parameter indicative of the scale and/or of the support region.

3. Scale-Invariant Real-Scale-Aware Feature Description According to a Third Aspect of the Invention:

According to this aspect of the invention, it is proposed to define the scale of a feature descriptor based on the intensity image as done in standard approaches. The method according to this aspect comprises the steps of providing an intensity image captured by a capturing device, providing a method for determining a depth of at least one element in the intensity image, detecting at least one feature in the intensity image based on image intensity information provided by the intensity image, and providing a feature descriptor of the at least one detected feature with an indicator of a particular scale. The feature descriptor contains at least one first parameter based on image intensity information provided by the intensity image and at least one second parameter indicative of a combination of the scale and a depth of at least one element in the intensity image being a part of the detected feature.

For example, the second parameter is indicative of a product of the scale and the depth of at least one element in the intensity image being a part of the detected feature.

According to an embodiment, the second parameter, which optionally includes information about a focal length of the capturing device, is used as a basis for a selection step in a subsequent feature matching process in which only those features of another intensity image are considered as possible matches for the detected feature that have a feature descriptor including at least one parameter similar to the at least second parameter.

Preferably, the second parameter is invariant to a distance of a detected feature to the capturing device.

According to an embodiment, the feature descriptor contains in addition to a description of the intensity image in a support region around the feature a scalar value, for example s*d. Thereby s denotes the scale of the feature descriptor and d is the depth of the feature. While this value is ideally invariant to the distance of a feature to the capturing device, it provides a distinct description of a feature. If the depth d (or distance) of a feature doubles, the size of this feature in the intensity image, and therefore its scale s will decrease by half. It is clear to the skilled person that the focal length does not matter as long as it is constant. But in a general case, where any camera can be used, it matters. Thus, the constant would be (s*d)/f instead, where f is the focal length. This is important in order to ensure the interoperability of the data between cameras with differing focal lengths. The product of scale and depth (and optionally focal length) can for instance be used to speed up feature matching by only considering those features as possible matches that have a similar s*d value.

Figure 7:
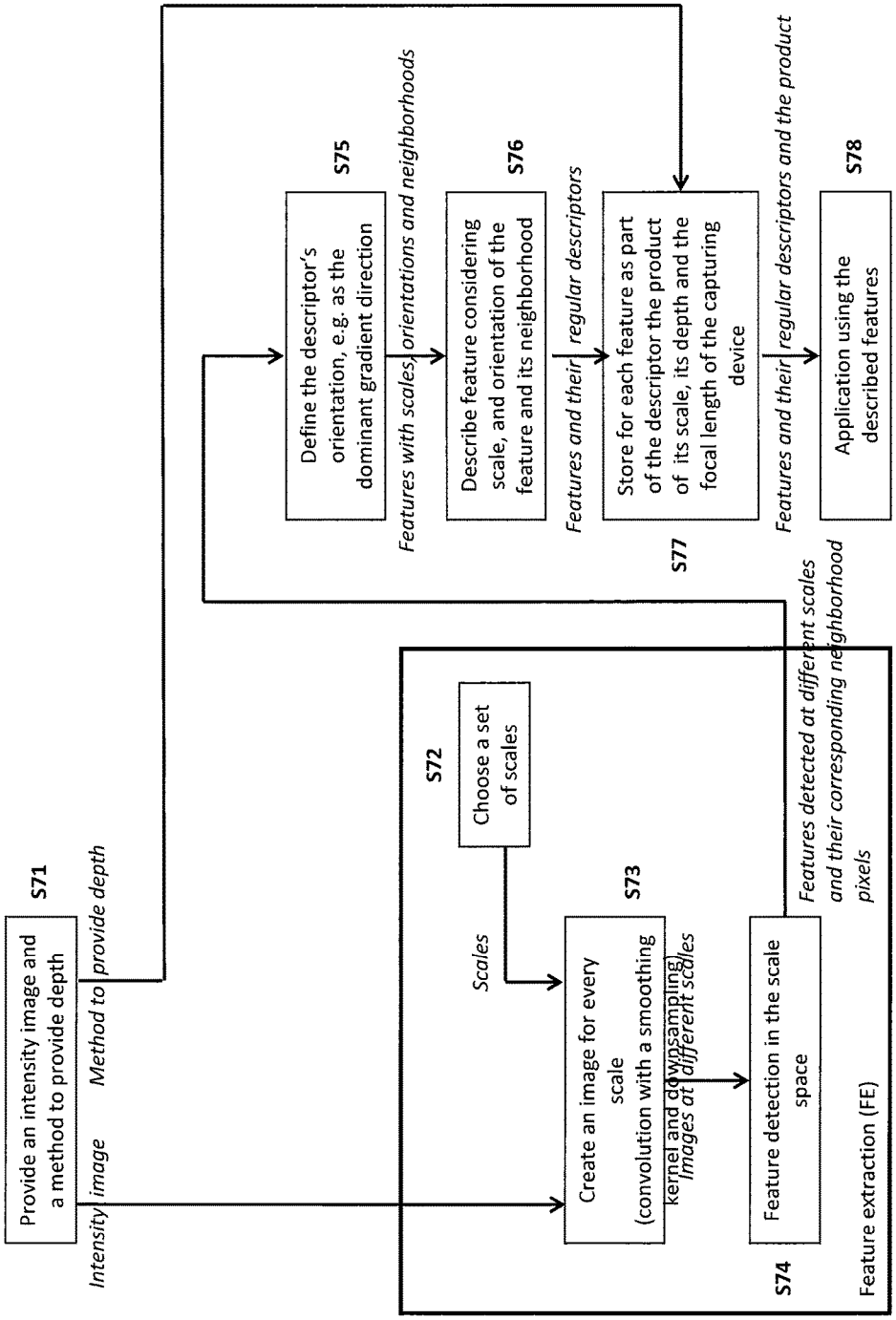
FIG. 7 shows a flow diagram of a method according to an embodiment of another aspect of the invention.

FIG. 7 shows a flow diagram of a method according to an embodiment of the third aspect of the invention. After capturing an intensity image with a capturing device or loading an intensity image in step S71 and providing a method to gain depth samples of particular points in the intensity image, a scale space of the intensity image is created in step S73 at scales defined in step S72. In step S74, features are extracted from the scale space images. For every feature, an orientation is assigned in step S75 and a description is computed in step S76. Note, that the method so far does not differ from a regular scale-invariant method such as SIFT. In the following step S77, according to the invention the depth of the feature provided by a method provided in step S71 is incorporated. In this case, the depth forms a part of the descriptor and is multiplied with the feature scale and optionally the focal length, as explained above. Eventually, the described features are used in an application in step S78. In possible implementations of the invention, features are extracted in order to provide depth (e.g. using a stereo camera). In that case, the features can immediately be passed to step S75 and steps S72, S73 and S74 (i.e. feature extraction FE) do not have to be conducted (any more).

4. Depiction of Exemplary Results

Figure 9:
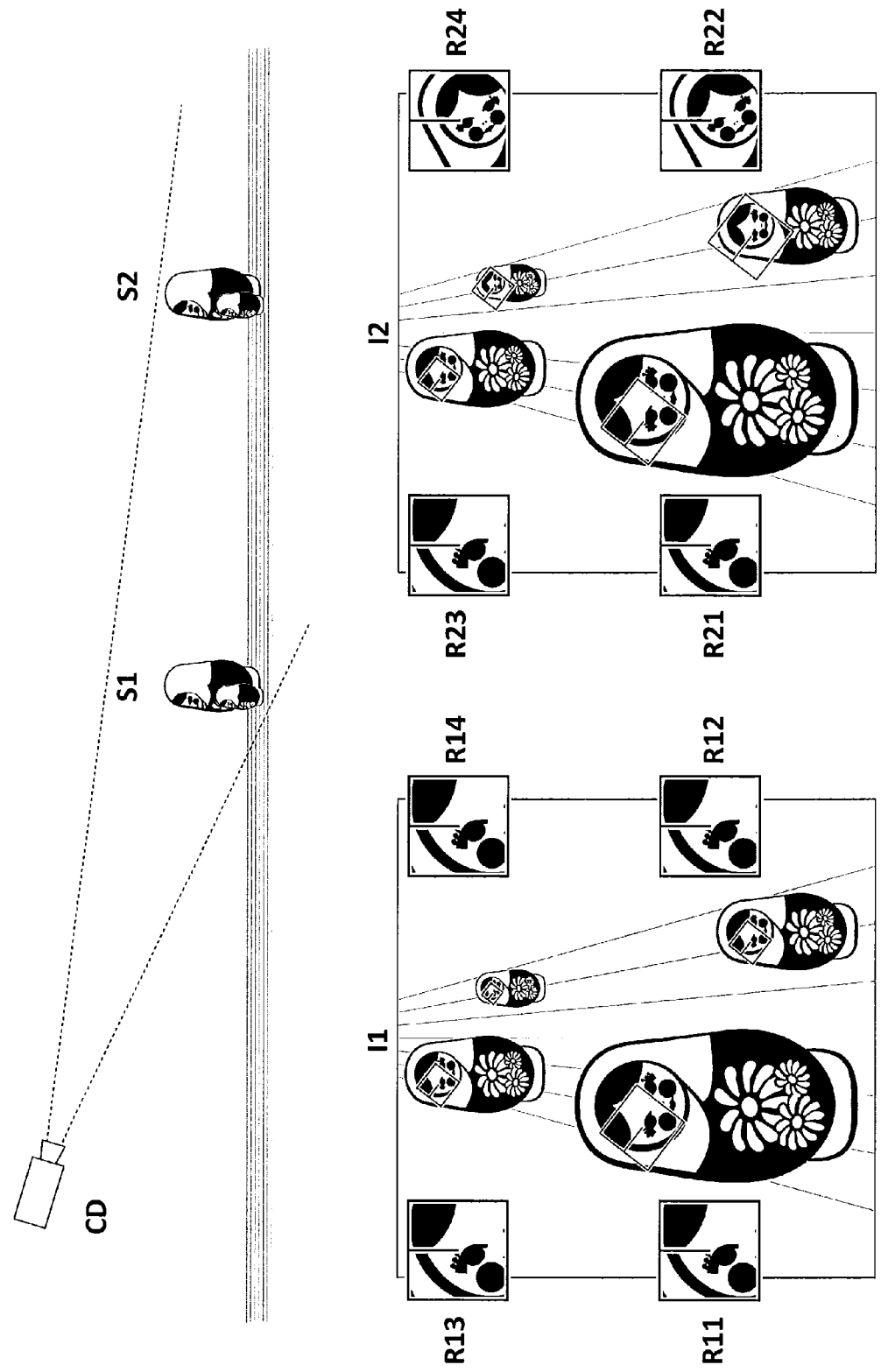
FIG. 9 illustrates an exemplary scene which compares the technique according to aspects of the invention with standard approaches showing a setup where a capturing device captures a scene consisting of two sets of dolls.

FIG. 9 compares the new technique according to the above described aspects of the invention with standard approaches at a setup where a capturing device CD captures a scene consisting of two sets of dolls, S1 and S2. Each set contains two similar dolls at different scales (i.e. a tall doll and a smaller doll). The two sets S1 and S2 are located at different distances from the capturing device CD. The left figure I1 illustrates an image captured with CD. The overlaid squares indicate the support regions of a standard scale-invariant feature descriptor for features located at the right eye of every doll. The insets R11, R12, R13 and R14 show the parts of the image covered by the support regions of the individual features. As can be seen, they are all identical as a result of invariance to scale. While this enables matching features of an object at different distances e.g. R11 and R13, it does not provide discrimination between similar objects at different physical scales, e.g. R11 and R12.

In contrast, 12 shows the same captured image with support regions of four features at the right eye of each doll, scaled with a proposed method according to the invention.

While the support region and therefore the descriptor is invariant to the distance of an object from the camera, e.g. R21 and R23 or R22 and R24, it differs for similar objects at different scales. For example the support region R21 and R22 clearly differ in their image content, which results in distinct feature descriptors.

5. Possible Methods to Provide Depth Samples

There are several methods possible to provide depth samples used in a method as set out above, which can later be used in a feature detection and description approach according to the invention. This is also a major differentiator to existing approaches in the area which rely on scans and dense depth data. The depth of a pixel refers to the distance between the physical surface that is imaged in this pixel and the optical center of the capturing device. Depth data can be dense or sparse. Our approach can work with dense depth data. In addition, our approach can work with sparse depth data, because having depth information for the features themselves can be enough to create our descriptor based on scale.

As mentioned earlier, the depth of a pixel is defined as the distance between the principal point of the capturing device and the physical 3D surface that is imaged in that pixel. As a feature is not necessarily a point or pixel, but can have any shape, the question arises what the depth of a feature is. According to an embodiment, the depth of a feature may be defined as any weighted average of the set of depth samples belonging to this feature. This definition includes randomly picking one depth sample (with weight 1) and assigning all other samples the weight 0.

In general the proposed methods can fall back to alternative feature descriptors (e.g. classical SIFT), when it is not possible to retrieve depth for a part or all parts of the image. This also means that scale invariant feature descriptors and our real scale feature descriptor can be used in a mixed way.

5.1 Depth from calibrated cameras

According to an embodiment to determine a depth of at least one element in an intensity image, at least two capturing devices with known relative position and/or orientation each capture a respective intensity image, wherein correspondences are found in the images and the relative position and/or orientation of the capturing devices is used to calculate a depth of at least one element in the intensity images which is part of at least one of the correspondences.

Particularly, one possibility to provide depth data is as follows: At least two cameras, recording intensities with known relative pose and ideally known intrinsic parameters, can capture images at approximately the same time or, when not moving, at different times. Correspondences can be found in both images and the relative pose and intrinsic of the cameras can be used to calculate the correspondences depth in either image coordinate system. It is advantageous to retrieve the relative pose and intrinsic parameters before trying to find correspondences, because they can be used to simplify the creation of correspondences through introducing additional constrains (e.g. epipolar geometry).

For example, the finding of correspondences based on point features can be implemented as follows: To match a 2D feature from one image to another, the patch around the 2D feature of specified size is searched in the other image. For instance, the sum-of-square-differences (SSD) or the normalized cross-correlation (NCC) can be used as distance or similarity measure, respectively. To reduce the number of comparisons needed to search the corresponding patch, it is only searched along the epipolar line of the feature point in the other image. To simplify the search along the epipolar line to a 1D-search, the images are first rectified. The two patches with the highest similarity are set into relation. If the one with the highest similarity is significantly more similar than the second highest similarity, the former one will be considered as matching correspondence.

Of course, to the expert it is clear, that many possibilities exist to gain correspondences. It is also possible to gain correspondences without taking into account the epipolar-lines. Of course, the process can also be implemented in an iterative fashion, using initial depth estimations to work with our proposed real scale feature descriptors and recalculate the correspondences and positions of the features with higher accuracy.

5.2 Depth from at Least One Moving Camera

According to another embodiment to determine a depth of at least one element in an intensity image, at least one capturing device captures intensity images at different points of time from different positions, wherein correspondences are found in the different images and a relative position and/or orientation of the capturing device between the different images and a structure of the correspondences are recovered and used to calculate a depth of at least one element in the intensity images which is part of at least one of the correspondences.

For example, at least one camera takes images at different points of time from different positions. Ideally some additional sensor measurements are available (for example GPS positions). The images and additional information, if available, are then analyzed. Correspondences in the different images are found, for example by tracking features from image to image or by detecting local features and using scale invariant descriptors to match them. Then, a so called structure from motion (SfM) approach is used to recover the relative poses between the different images and the structure of the correspondences. There are many different approaches known to the skilled person. Ideally additional sensor data, like GPS positions or known movement of the camera (e.g. in a car by measuring the car's movement) can be used to give the structure of the correspondences a physical scale. Alternatively if in any image a known object, with known size can be retrieved (e.g. a dollar bill or a marker), physical scale can also be retrieved. In case physical scale cannot be retrieved, a scale is assumed and, our approach can still be used, but will only make sense for further matching in this exact scenario. For example in order to track camera movement in order to superimpose game-characters for a video game, the exact size of the movements might not matter, but realistic relative movements are important. Increased matches through real scale feature descriptors can help here.

Again, this process can be implemented in an iterative way, using initial scale estimations to refine the correspondences, leading to higher accuracy in pose estimations and structure.

5.3 Depth from Image Matching

According to another embodiment to determine a depth of at least one element in an intensity image, there is provided at least one database of intensity images, wherein for each of the intensity images an overall depth, or depth for at least one image region, or depth for one or more pixels is known and the intensity image captured by the capturing device (current intensity image) is matched against this database. The matching result is used to calculate a depth of at least one element in the current intensity image.

For example, an approach to retrieve depth associated to an image is as follows: We assume a database of images exists and for each image either one overall depth (e.g. 10 m) or depth for individual image regions or depth for each pixel is known. The current image taken is now matched against this database. In order to speed up the process and/or to increase robustness, an optional step can be used to create an optimized data structure for image matching. This can for example be building a vocabulary tree or a KD-tree from the feature descriptors.

The method can try to register both images using the detailed depth information (if existing) from the database image and our proposed real scale feature descriptors or using other methods. If this is not possible or no detailed depth information is provided, the one given depth or the average depth is returned.

5.4 Depth from 3D Model Information and Sensor Information

According to another embodiment to determine a depth of at least one element in an intensity image, there is provided an environment model and information about a position and/or orientation of the capturing device when capturing the intensity image with respect to the environment model (which may be an initial estimation), wherein the environment model and the information about the position and/or orientation of the capturing device are combined and used to calculate a depth of at least one element in the intensity image.

For example, assuming an environment model can be provided, which can for example be a constructed 3D model or a scan of the environment. If any information is known about the position and/or orientation of the capturing device when the image was taken with respect to the environment model, both can be combined. For example, by rendering the 3D model with the assumed camera pose and camera intrinsic, the depth of every pixel can be obtained from the depth buffer provided by the environment model and used during rendering. Although an initial pose estimation is necessary for this approach, using the assumed depth and the present invention with a textured environment model, the pose can then be refined and become more accurate, among other applications. Of course this process might also be used iteratively.

5.5 Depth from Dedicated Sensors

According to another embodiment to determine a depth of at least one element in an intensity image, there is provided at least one sensor for retrieving depth information or range data and at least a relative position and/or orientation of the at least one sensor with respect to the capturing device, wherein the depth information or range data is used to calculate a depth of at least one element in the intensity image. Preferably, the pose (position and orientation) and intrinsic parameters of, both, the sensor and the capturing device are known.

Particularly, a method to retrieve depth information is using special sensors, specialized on retrieving depth information or range data. That can for example be a time of flight mechanism, like a laser scanner or a time of flight camera. Another example are sensors, which project a known pattern of light into the environment and retrieve the pattern after it was reflected by the environment with a sensor. By matching the projected information and the received pattern and by knowing the pose of the projector towards the retrieving sensor and by knowing the intrinsic parameters of both projector and sensor, depth can be calculated.

Another sensor allowing the retrieval of depth data is a plenoptic camera (e.g., see D. V. Johnston, Learning Depth in Lightfield Images, CS229 Machine Learning Autumn 2005, Stanford University, 2005, http://www.stanford.edu/class/cs229/proj2005/Johnston-LearningDepthInLightfield-Images.pdf)

In order to use the depth-sensor's information with the intensity image, the pose and intrinsics of both are known. The depth information can then be transformed into the camera coordinate system and be used.

6. Further Aspects of the Invention

According to an embodiment of the invention, the method for determining a depth of at least one element in the intensity image is based on an optical focus of the capturing device.

Figure 8:
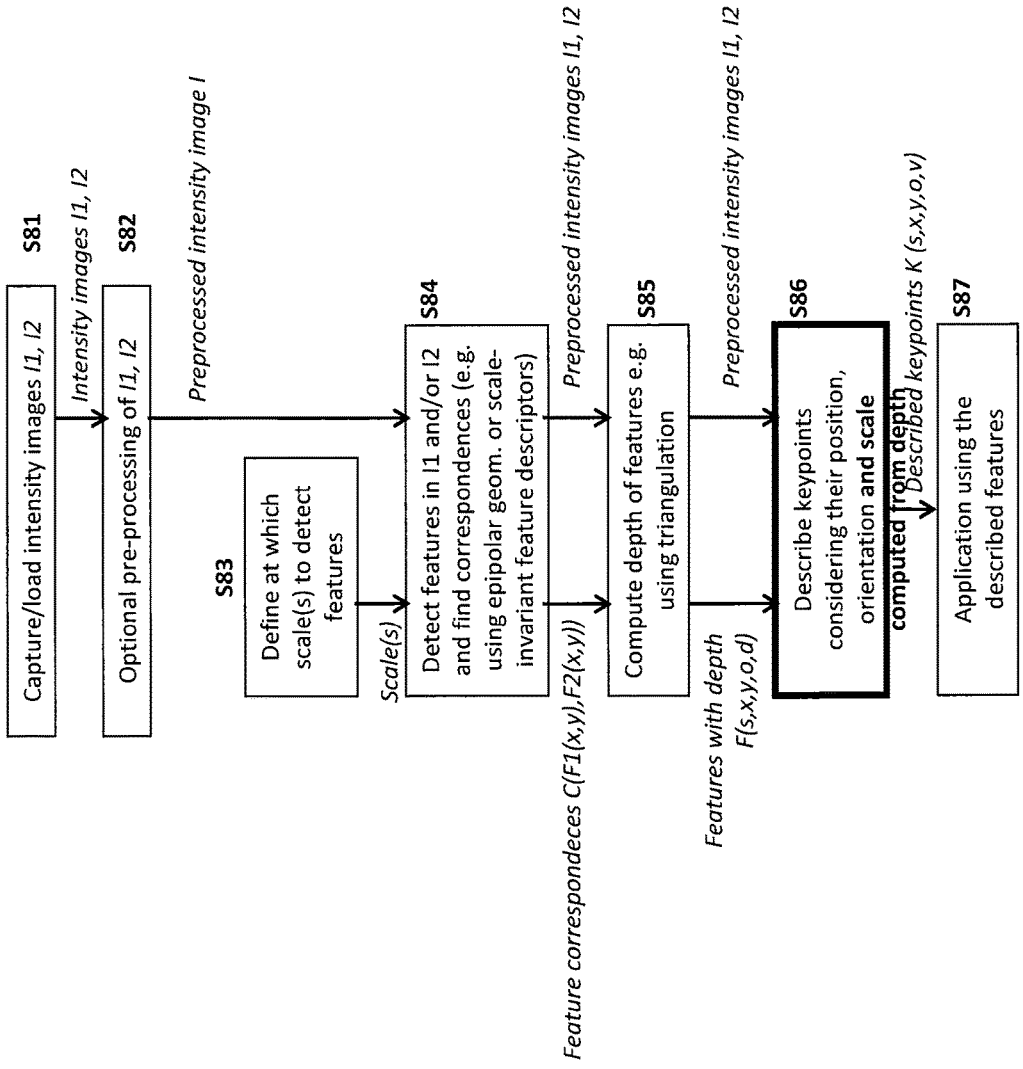
FIG. 8 shows a flow diagram of a method according to an embodiment of another aspect of the invention.

According to another embodiment of the invention, in the method for determining a depth of at least one element in the intensity image, depth samples of elements in the intensity image are generated by extracting features of the intensity image and at least one further intensity image and matching them using the epipolar geometry of a stereo-camera pair capturing the intensity image and the at least one further intensity image. In this case where the features are extracted in order to provide depth (e.g. using a stereo-camera) the extracted features can immediately be used for the feature description. For example, FIG. 8 shows a flow diagram of a method according to this embodiment of the invention. First, in step S81, intensity images I1 and I2 are captured by a camera or loaded which may then optionally be subject to pre-processing in step S82. In step S84 after a scale space or a set of discrete scales has been defined in step S83, features are detected in that scale space in I1 and/or I2 and correspondences are determined, for example using the epipolar geometry of the stereo-camera pair or scale-invariant feature descriptors for a mono-camera setup. A detected features correspondence C(F1(x,y), F2(x,y)) with Fi designating the two corresponding features and x, y designating a 2-dimensional position of the respective feature Fi is considered to describe projections of the same point in 3D space into I1 and I2 and thus, the depth, i.e. the position in 3D space of this point can be computed for example by triangulation in step S85. Before using the described features eventually in an application (step S87), the extracted features or keypoints K are described in step S86. The description contains the descriptor v, which is created from intensity data. In addition, it can make sense, depending on the application, to store their position in the image (x,y) or their 3D position (can be calculated from depth). Optionally, the scale s, orientation o and determined depth d may also be stored with respect to the keypoints. In order to employ the invention, it is not necessary to store the scale as part of the descriptor. For example, scale could also be defined globally to 10 mm or 1000 mm for certain depths or using a general formula dependent from the depth d, which applies to all features in the application. As described above with respect to FIGS. 6 and 7, in Step 86 either a method according to an embodiment of the invention as described in chapter 2 (for example, starting from S65 in FIG. 6) or chapter 3 (for example, starting from S75 in FIG. 7) may be used. In case of an embodiment according to chapter 3, K will also further comprise a value derived from combining s and d (and optionally the camera's focal length).

According to a further embodiment of the invention, the depth of at least one element in the intensity image is estimated using visual search algorithms to initially compare different distances.

According to an embodiment of the invention, the method may further comprise the steps of providing a measurement of a position and orientation of the capturing device in a global coordinate system, determining a pose of the capturing device from the measurement, providing a 3D model of an environment, wherein the pose is used in combination with the 3D model to compute the depth of at least one element of a feature in the intensity image, for example by means of casting a virtual ray from the capturing device center through the feature into the 3D model. This is explained below with respect to FIG. 11 in more detail.

Measurements of position of the capturing device in a global coordinate system may be provided by a GPS sensor/receiver, IR or RFID triangulation, or by means of localization methods using a broadband or wireless infrastructure. Measurements of orientation of the capturing device in a global coordinate system may be provided by at least one of an inertial sensor, an accelerometer, a gyroscope, a compass, or a mechanical, electromagnetic, acoustic, or optical tracking system. In the context of the invention, an inertial sensor may, e.g. continuously, provide sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

According to a further aspect of the invention, there is provided a tracking or recognition method for tracking a position and/or orientation of a capturing device with respect to an object of an intensity image captured by the capturing device, or for recognizing an object of an intensity image captured by the capturing device, respectively, which uses a method as described above.

7. Applications

In general, the invention can be used in all scenarios, where currently descriptors like SIFT or SURF are being used, like visual search and image matching, 3D reconstruction and optical pose estimation and tracking.

Possible combinations of a depth providing methods with real scale feature descriptors may be used in optical pose estimation and tracking, for example in order to create outdoor AR experiences. For example, depth is extracted using rough sensor data and an environment model as depicted in FIG. 11. In step S111, an intensity image I1 is captured by a capturing device or loaded. In addition, an initial pose of the capturing device while capturing I1 is estimated from rough sensor measurements such as GPS position and orientation sensor information. Finally, an advanced environment model including 3D data and image data (similar to Google Streetview) is provided (step S112). Image data is only necessary, if a reference model for tracking (e.g. already containing feature 3D coordinates and feature descriptors) has not been created in advance. In step S113, the environment model is loaded using the assumed camera pose provided by step S111, i.e. the environment model is rendered from the camera viewpoint of intensity image I1. In step S114, depth information is retrieved from the environment model and used in step S115 for calculating the real scale descriptors of detected features. In other words, using the depth information registered with the image I1, real scale features are extracted at a fixed scale of, for example 1 m. Because the environment model combines 3D data and image data, a reference 3D model of physical scale features with a scale of 1 m can be created (S116, this can of course be done in advance).

The results of S115 and S116 can then be used to create correspondences of features in I1 and 3D physical scale features. Using an optimization algorithm, the refined pose of I1 in the environment model's coordinate system can be calculated. The refined pose can then be used for an application, e.g. an Augmented Reality visualization of tourist data, or optionally be used to refine S111 and iterate through steps S111-S117, until the change in pose has gone below a defined quality threshold.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A method of detecting and describing features from an intensity image, comprising:
obtaining a 2D intensity image captured by a capturing device;
determining a depth of at least one element in the 2D intensity image based on light reflected from the at least one element;
scaling a size of a support region covering a portion of the 2D intensity image according to the determined depth;
detecting a feature in the 2D intensity image based on image intensity information of the support region; and
providing a feature descriptor of the detected feature,
wherein the scale at which the feature is detected depends on a depth sample for the support region.

2. The method according to claim 1, wherein the feature descriptor contains at least one first parameter based on information provided by the 2D intensity image and at least one second parameter which is indicative of the scale of the size of the support region.

3. The method according to claim 1, wherein
the feature descriptor describes the detected feature based on information provided by the 2D intensity image in a support region adjacent to the detected feature.

4. The method according to claim 1, further comprising:
determining that the at least one element in the 2D intensity image belongs to the detected feature based on intensity values in the 2D intensity image.

5. The method according to claim 4, wherein determining that at least one element belongs to the detected feature comprises performing feature detection at a scale that depends inversely proportional to the depth of the at least one element in the 2D intensity image.

6. The method according to claim 1, wherein the scale at which the feature is detected corresponds to a physical size of the feature.

7. The method according to claim 1, wherein the support region is scaled inversely proportional to the depth of the at least one element in the 2D intensity image.

8. The method according to claim 1, further comprising:
generating respective representations of the 2D intensity image for a plurality of scales, and
detecting the feature in the 2D intensity image at the respective scales.

9. The method according to claim 1, wherein supporting points in the intensity image are used for providing the feature descriptor which comprise points specified by a geometry surrounding one of the points which has been identified in the feature detection process as being a part of the detected feature,
wherein the geometry varies according to the depth of the one of the points.

10. The method according to claim 1, wherein the scale of the size of the support region is a global setting and the feature descriptor does not contain a second parameter indicative of the scale.

11. The method according to claim 1, wherein determining a depth of at least one element in the 2D intensity image is based on an optical focus of the capturing device.

12. The method according to claim 1, wherein determining a depth of at least one element in the 2D intensity image comprises generating depth samples of elements in the intensity image by extracting features of the 2D intensity image and at least one further 2D intensity image and matching the depth samples using the epipolar geometry of a stereo-camera pair capturing the intensity image and the at least one further 2D intensity image.

13. The method according to claim 1, wherein the depth of the at least one element in the 2D intensity image is estimated using visual search algorithms to initially compare different distances.

14. The method according to claim 1, further comprising:
obtaining a measurement of a position and orientation of the capturing device in a global coordinate system;
determining a pose of the capturing device from the measurement; and
generating a 3D model of an environment;
wherein the pose is used in combination with the 3D model to compute the depth of the at least one element.

15. The method according to claim 14, further comprising tracking the capturing device with respect to an object of the intensity image captured by the capturing device using the 3D model of the environment.

16. A method of detecting and describing features from an intensity image, comprising:
obtaining a 2D intensity image captured by a capturing device;
determining a depth of at least one element in the 2D intensity image based on light reflected from the at least one element;
detecting at least one feature in the intensity image based on image intensity information provided by the 2D intensity image;
determining a depth of at least one element in the 2D intensity image, wherein the at least one element is part of the detected feature;
generating a support region surrounding the detected feature at a size scaled according to the determined depth; and
providing a feature descriptor of the at least one detected feature, the feature descriptor containing at least one first parameter based on information provided by the 2D intensity image, and at least one second parameter indicative of a combination of a depth of at least one element and a size of the support region,
wherein the second parameter is indicative of a product of the size of the support region and the depth of the at least one element in the 2D intensity image.

17. The method according to claim 16, wherein the second parameter is used as a basis for a selection step in a subsequent feature matching process in which features of another 2D intensity image are considered as possible matches for the detected feature that have a feature descriptor including a parameter equivalent to the second parameter.

18. The method according to claim 16, wherein the second parameter is invariant to a distance of the detected feature to the capturing device.

19. A non-transitory computer readable medium comprising software code which, when executed by one or more processors, causes the one or more processors to:
obtain a 2D intensity image captured by a capturing device;
determine a depth of at least one element in the 2D intensity image based on light reflected from the at least one element;
scale a size of a support region covering a portion of the 2D intensity image according to the determined depth;
detect at least one feature in the 2D intensity image based on image intensity information of the support region; and
provide a feature descriptor of the at least one detected feature,
wherein the scale at which the feature is detected depends on a depth sample for the support region.

20. The non-transitory computer readable medium of claim 19, wherein the feature descriptor contains at least one first parameter based on information provided by the 2D intensity image and at least one second parameter which is indicative of the scale of the size of the support region.

21. The non-transitory computer readable medium of claim 19, wherein the feature descriptor describes the detected feature based on information provided by the 2D intensity image in a support region surrounding the detected feature.

22. The non-transitory computer readable medium of claim 19, further comprising software code configured to cause the one or more processors to determine that the at least one element in the 2D intensity image belongs to the detected feature based on intensity values in the 2D intensity image.

23. The non-transitory computer readable medium of claim 22, wherein the software code configured to cause the one or more processors to determine that at least one element belongs to the detected feature comprises software code configured to cause the one or more processors to determine perform feature detection at a scale that is inversely proportional to the depth of the at least one element in the 2D intensity image.

24. A system, comprising:
a capturing device;
one or more processors; and
a memory coupled to the one or more processors and comprising computer code which, when executed by the one or more processors, causes the one or more processors to:
obtain a 2D intensity image captured by a capturing device;
determine a depth of at least one element in the 2D intensity image based on light reflected from the at least one element;
scale a size of a support region covering a portion of the 2D intensity image according to the determined depth;
detect at least one feature in the 2D intensity image based on image intensity information of the support region; and
provide a feature descriptor of the at least one detected feature,
wherein the scale at which the feature is detected depends on a depth sample for the support region.

* * * * *